(12) United States Patent
Kangas

(10) Patent No.: US 8,120,468 B2
(45) Date of Patent: *Feb. 21, 2012

(54) SECURITY SYSTEM FOR INVENTORY

(75) Inventor: P. Daniel Kangas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,960

(22) Filed: Apr. 22, 2010

(65) Prior Publication Data
US 2010/0198706 A1 Aug. 5, 2010

Related U.S. Application Data

(63) Continuation of application No. 12/275,227, filed on Nov. 21, 2008, now Pat. No. 7,808,388, which is a continuation of application No. 11/427,975, filed on Jun. 30, 2006, now Pat. No. 7,477,149.

(51) Int. Cl.
H04Q 5/22 (2006.01)
(52) U.S. Cl. .................................. 340/10.1; 340/568.1
(58) Field of Classification Search .................. 340/10.1, 340/568.1, 5.92; 705/23, 16
See application file for complete search history.

(56) References Cited

U.S. PATENT DOCUMENTS

| 5,252,948 | A | * | 10/1993 | Goris et al. ................ 340/568.8 |
|---|---|---|---|---|
| 5,745,036 | A | | 4/1998 | Clare |
| 5,942,978 | A | | 8/1999 | Shafer |
| 6,043,746 | A | | 3/2000 | Sorrells |
| 6,507,279 | B2 | | 1/2003 | Loof |
| 6,598,790 | B1 | | 7/2003 | Horst |
| 7,477,149 | B2 | | 1/2009 | Kangas |
| 7,808,388 | B2 | | 10/2010 | Kangas |
| 7,868,763 | B2 | | 1/2011 | Kangas |
| 2004/0143505 | A1 | | 7/2004 | Kovach |
| 2005/0040950 | A1 | | 2/2005 | Clucas |
| 2005/0103842 | A1 | | 5/2005 | Bong et al. |
| 2006/0187042 | A1 | | 8/2006 | Romer et al. |
| 2008/0001747 | A1 | | 1/2008 | Kangas |
| 2009/0066515 | A1 | | 3/2009 | Kangas |
| 2009/0322529 | A1 | | 12/2009 | Kangas |

FOREIGN PATENT DOCUMENTS
EP 0623904 A1 11/1994

OTHER PUBLICATIONS

P. Daniel Kangas, U.S. Appl. No. 11/427,975, filed Jun. 30, 2006, Office Action, Mar. 31, 2008, 10 pages.

(Continued)

Primary Examiner — Shirley Lu
(74) Attorney, Agent, or Firm — Marcia L. Doubet

(57) ABSTRACT

A security system for inventory automatically detects removal of inventory items from an area or areas protected with security sensors. A person removing the item then scans an identifying code of the item, such as its bar code or radio-frequency identification ("RFID") tag, with a device such as a portable shopping assistant device; if the item is not scanned in an appropriate manner, such as within a particular a time period, then theft of the item may be suspected. Information for completing a purchase transaction can be sent from the portable shopping assistant device. In this manner, items can be purchased directly from the protected areas.

20 Claims, 9 Drawing Sheets

OTHER PUBLICATIONS

P. Daniel Kangas, U.S. Appl. No. 11/427,975, filed Jun. 30, 2006, Notice of Allowance, Aug. 29, 2008, 8 pages.

P. Daniel Kangas, U.S. Appl. No. 12/105,623, filed Apr. 18, 2008, Office Action, Mar. 17, 2010, 9 pages.

P. Daniel Kangas, U.S. Appl. No. 12/275,227, filed Nov. 21, 2008, Notice of Allowance, Mar. 1, 2010, 9 pages.

P. Daniel Kangas, U.S. Appl. No. 12/275,227, filed Nov. 21, 2008, Examiner Interview Summary, Mar. 2, 2010, 3 pages.

P. Daniel Kangas, U.S. Appl. No. 12/105,623, filed Apr. 18, 2008, Notice of Allowance, Sep. 2, 2010, 4 pages.

P. Daniel Kangas, U.S. Appl. No. 12/275,227, filed Nov. 21, 2008, Notice of Allowance, May 26, 2010, 7 pages.

* cited by examiner

SECURITY SYSTEM FOR INVENTORY

BACKGROUND OF THE INVENTION

The present invention relates generally to a security system for inventory, and more particularly to automatically detecting removal of inventory items from an area or areas protected with security sensors (such as radio-frequency identification, or "RFID", sensors), and in a retail environment, enables shoppers to purchase items directly from shelves or other protected areas.

Theft and shoplifting are problems in many environments. For retail businesses, for example, billions of dollars are lost every year to shoplifting. Employee theft from inventory stored in warehouses is also a serious problem and results in large amounts of lost revenue.

In the retail environment, traditional checkout involves a cashier at the front of the store scanning individual products and completing a purchase transaction for a shopper, all at one time. In recent years, self-checkout point-of-sale ("POS") stations have been introduced by some retailers. While these self-checkout stations may reduce labor costs for the retailer and reduce waiting time for customers making purchases, new challenges are introduced in preventing theft. Presently, a retailer creates a database of each inventory item offered for sale, where the information stored for each item typically includes the item's Uniform Product Code ("UPC", sometimes referred to as a "bar code") or other identifying code, description, price, and weight. When a shopper scans the UPC of an item being purchased using a scanning mechanism at the POS station, the item weight is retrieved from the database. Shoppers are typically directed by the self-checkout POS station to place all purchased items in a particular area of the station, where the collection of scanned items can be weighed. The weight of the collection is then compared against the expected weight of all scanned items (e.g., to determine whether any non-scanned items have been added).

This present approach to self-checkout represents a large amount of time spent at the checkout station. As an additional drawback of this approach, theft is not adequately prevented.

It is known in the art to use RFID scanning of items—either individually or in bulk—at the front of a store, all at one time, to complete a single purchase transaction. For bulk scanning, for example, the entire contents of a shopper's shopping cart may be scanned at a checkout area in the front of a store. However, in actual practice, the radio-frequency energy from the RFID tags tends to be shielded by metal items that may be present in the cart, such as canned goods, aluminum foil, and so forth, and thus this type of bulk scanning sometimes provides incomplete information.

BRIEF SUMMARY OF THE INVENTION

In preferred embodiments, the present invention provides a security system for inventory whereby removal of inventory items from an area or areas protected with security sensors can be automatically detected. Theft of inventory items can therefore be detected and reported. This preferably further comprises, in one aspect, a security system for inventory, comprising: at least one security sensor positioned to protect an area (such as a shelf or display case, or portion thereof) by detecting presence of each of at least one items contained within the area, wherein each of the at least one items has a transmission mechanism coupled thereto or integrated therewithin, the transmission mechanism capable of sending signals that are detectable by the at least one security sensor while the item remains within proximity of at least one of the at least one security sensors; and processing removal of any of the at least one items, responsive to failing to detect the presence thereof within the area. In this aspect, processing the removal preferably comprises: identifying the removed item and a person removing it; and awaiting a signal that the person removing the item completes a removal transaction within a designated time period, and if not, treating the removal as a potential theft.

Preferably, each of the at least one security sensors comprises at least one radio-frequency identification ("RFID") antenna, and the transmission mechanism is an RFID security tag (in which case identifying the removed item preferably further comprises obtaining an item identifier from the RFID security tag).

In a further aspect, the prevention invention preferably comprises enabling item purchase directly from a protected area by monitoring, by at least one security sensor positioned to protect the area, presence of each of at least one items expected to be contained within the area, wherein each of the at least one items sends has a transmission mechanism coupled thereto or integrated therewithin, the transmission mechanism capable of sending signals that are detectable by the at least one security sensor while the item remains within proximity of at least one of the at least one security sensors; and responsive to detecting, by at least one of the security sensors, a removal of any of the at least one items, identifying the removed item and awaiting a signal that a person removing the item completes a purchase of the item within a designated time period following the removal, and if not, treating the removal as a potential theft.

In yet another aspect, the present invention preferably further comprises enabling item ownership transfer directly from a protected area by receiving notification that a security sensor disposed to protect an area from theft has detected removal of an item from the area, wherein the security sensor is adapted to receive communication signals from the item while the item remains within proximity of the security sensor and the item is adapted for iteratively transmitting the communication signals; notifying a remover of the item that the item should be purchased to avoid signalling a security system of the removal; and receiving notification, within a designated time period, that the remover of the item requests to purchase the item, and responsive to receiving the notification, for invoking a purchase transaction, or for signalling the security system of the removal otherwise.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Figure 1:
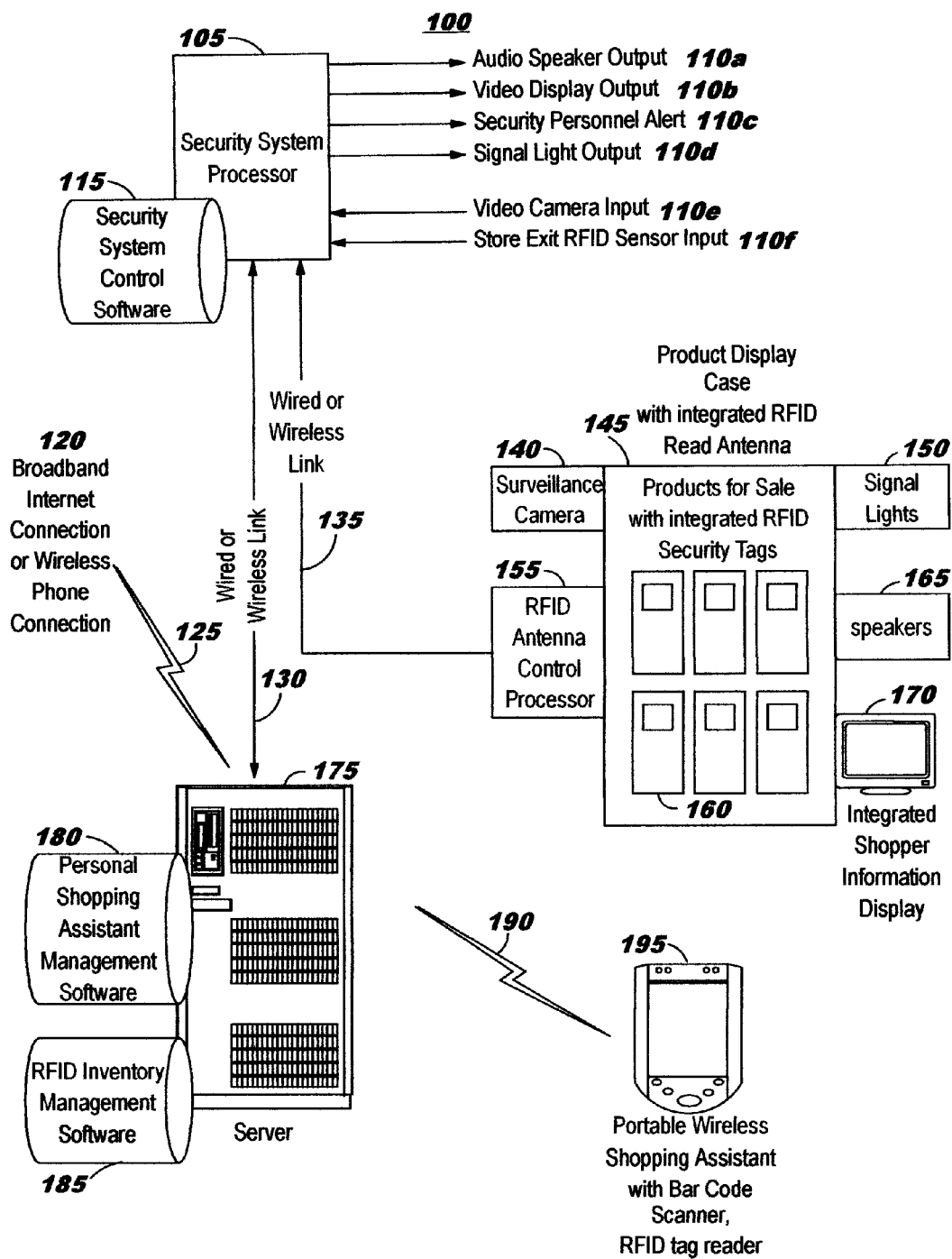
FIG. 1 depicts a sample configuration of components of a security system for inventory, according to preferred embodiments of the present invention.

Preferred embodiments of the present invention are directed toward a security system for inventory comprising items stored in an area or areas protected with security sensors. The protected area may comprise a shelf, a display area (such as a wall within a display case), a bin or other storage area (such as a freezer holding frozen items), or a portion thereof. When an item is removed from the protected area, its removal is automatically detected by the security sensors. In a retail environment, use of techniques disclosed herein enables a shopper to purchase items directly from a protected area (referred to hereinafter as a shelf for ease of reference), even though this shelf may be remotely located from the traditional front-of-store checkout location.

In preferred embodiments, the security sensors use radio-frequency identification ("RFID") technology. A person removing the item scans an identifying code of the item, such as its bar code or RFID security tag (referred to hereinafter as an "RFID tag"), with a device such as a portable shopping assistant device; if the item is not scanned in an appropriate manner, such as within a particular a time period, then theft of the item may be suspected (as will be described in more detail herein).

In a retail environment, an embodiment of the present invention may be used when shoppers are purchasing items in a traditional retail store, an open-air kiosk, a kiosk in an airport or other public area, and so forth. For the retail environment, the scanning of the item by the shopper preferably indicates that the shopper is making a purchase of the scanned item. In a warehouse environment or an environment where employees have access to expensive equipment (such as in medical laboratories), an embodiment of the present invention may be used when employees are removing items from shelves or other storage areas. For the warehouse environment, the scanning of the item preferably indicates that the employee is making a transfer of the scanned item (for example, from in-house inventory storage to shipping); if the item does not arrive at its intended destination, it may be presumed that this employee has stolen it. An embodiment of the present invention may be used in other environments as well, such as detecting when a library patron removes a library book from a shelf, and thus the uses and environments discussed herein are by way of illustration and not of limitation. For the library environment, the scanning of the item preferably indicates that the library patron is checking the scanned item out for his or her temporary loan. Whereas a shopper takes ownership of an item following a purchase transaction at the protected area, according to preferred embodiments, the person removing an item and carrying out a transaction in other environments may generally be considered as taking responsibility for (rather than ownership of) the removed item.

Components of a security system 100 for inventory, according to preferred embodiments, are depicted in the sample configuration of FIG. 1, and will now be described.

In preferred embodiments, the items in inventory each have an integrated information-transmitting and information-receiving device such as an RFID tag. See, for example, reference number 160 of FIG. 1. An RFID reader and tag system includes both passive elements (an antenna) and active elements (a read-write data memory, control circuitry, and a radio-frequency transponder). RFID tags are typically not self-powered, but may receive their power via capacitative coupling directly from energy in the radio frequency signal transmitted from an external radio frequency source to the RFID tag. When brought into proximity with an RFID reader at a typical effective distance of about 1 centimeter to 5 meters (depending on the type of tag and reader antennas), the RFID tag receives sufficient power to enable clocking the semiconductor and analog portions comprising the transponder, control circuits, and data memory through enough clock cycles that the tag can return the data bits from its memory as a digitally-encoded RF signal. This is advantageous because the tag can be read (or written) from a distance without the necessity of line-of-sight, as is required to read a bar code with a laser scanner.

Figure 2:
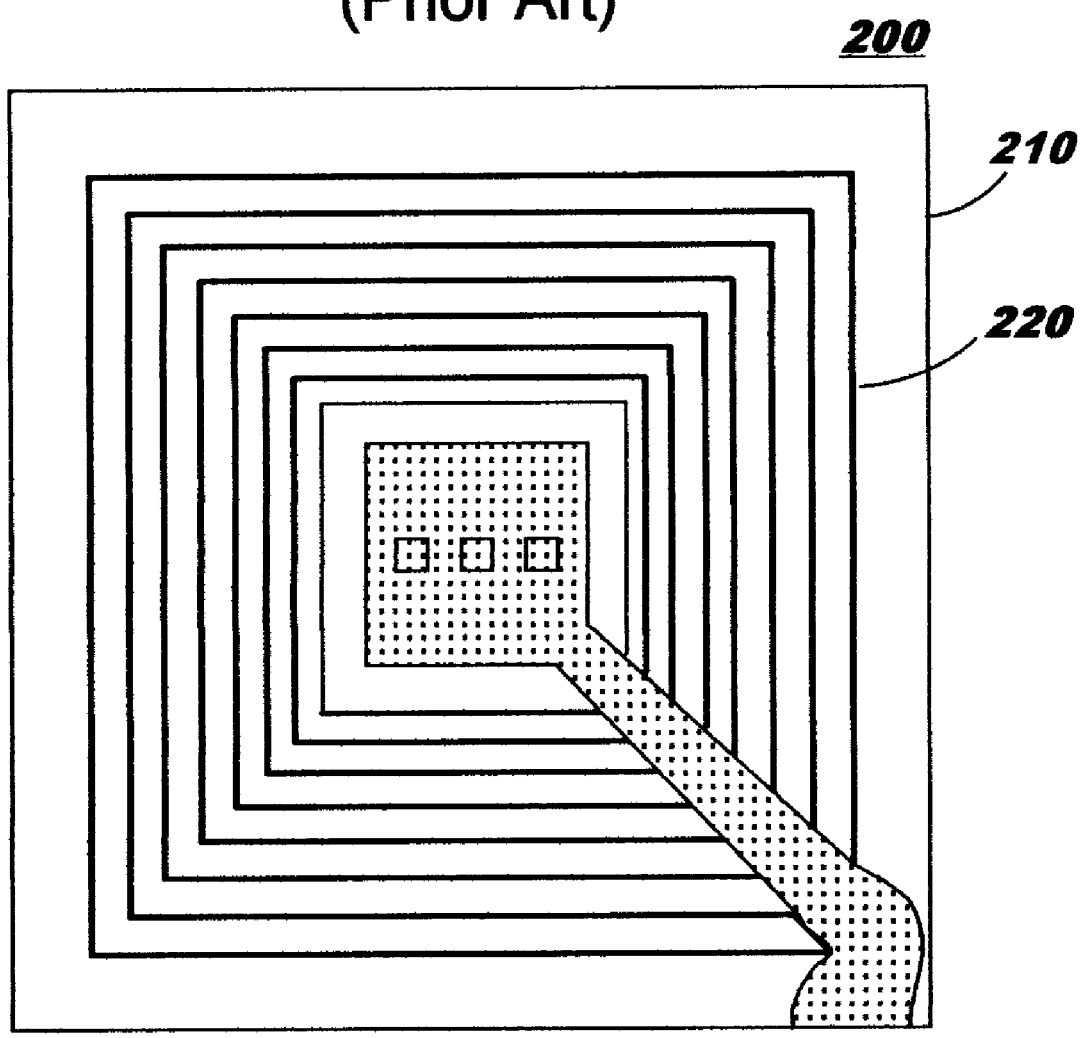
FIG. 2 illustrates a representative RFID tag, according to the prior art.

A representative RFID tag 200 of the prior art is illustrated in FIG. 2, showing a coiled antenna 220 (which in this example takes on a generally square shape) embodied on some type of substrate 210. Note that while discussions herein refer primarily to using RFID "tags", this is not meant to limit the present invention to use with a particular physical form of RFID implementation. RFID tags may be more generally referred to as transponders, and are generally capable of both transmitting and receiving data. An RFID tag may be attached to an item, may be embedded into the item, or may be provided in an embodiment independent from an item, and it is not necessary that the physical embodiment of the RFID components resembles a tag. For ease of reference, RFID tags are referred to herein as being integrated into an item. (While discussions herein are primarily in terms of RFID technology, this is by way of illustration and not of limitation, and other technology may be substituted without deviating from the scope of the present invention. In addition, the terms "RFID interrogator", "RFID reader", and "RFID antenna" are used herein by way of illustration.)

Referring again to FIG. 1, preferred embodiments include a protected area such as product display case 145, from which items may be removed by a shopper or other person. Preferably, the protection of the area comprises configuring the area with a security sensor (or sensors) capable of detecting item removal, such that a security sensor acts as a monitor for the area and its items. When the items use integrated RFID tags, the security sensors preferably comprise RFID antennas capable of sensing the signals which are periodically emitted from the item-integrated RFID tags, and these antennas are preferably positioned to detect whether the items remain within proximity of the protected area. The particular configuration of the security sensors within a protected area may vary, depending on factors such as the type of security sensor, its range and granularity of detection, the type of items contained within the protected area, and the type of protected area. As one example, if shelves in a grocery store are configured as protected areas, it may be desirable to segment each shelf at a particular lineal measurement for purposes of positioning the security sensors. A physical shelf may therefore contain multiple protected areas, such that the entire shelf may comprise a group of protected areas (which may be logically chained together). A shelf area protected by an RFID antenna configuration might be on the order of several feet in length or longer, for example. As another example, it may be desirable to configure an entire display case as one protected area by arranging multiple shelf segments, end-to-end down a store aisle.

FIG. 1 also illustrates a sample portable shopping assistant device 195, which in preferred embodiments is a relatively-small wireless device comprising a scanning mechanism such as a bar code scanner and/or an RFID tag reader, and means for communicating with security system 100. Preferably, the scanning mechanism is used when the shopper is purchasing an item and scans an item-identifying code to identify the item. The portable shopping assistant device 195 may include a bar code scanner for scanning legacy UPC codes or other types of bar codes. However, it is expected that RFID tags will become ubiquitous in the near future, and the shopping device 195 may alternatively use an RFID tag reader in addition to, or instead of, the bar code scanner. An example of a portable shopping assistant device that exists in the prior art and may be used as device 195 is the commercially-available IBM Mobile Tablet for Retail, marketed by the International Business Machines ("IBM") Corporation.

The shopping device 195 may communicate 190 with security system 100 using (by way of illustration but not of limitation) cellular phone technology, Bluetooth technology, 802.11 communications, or other wireless means to indicate that the shopper wishes to purchase a scanned item. Embodiments of the present invention may support different types of shopping devices, and optionally may support multiple types of shopping devices. The supported devices may be adapted for reading or scanning other types of item-identifying information beyond bar codes and RFID tags, without deviating from the scope of the present invention. Furthermore, devices may be used that are not specifically designed as "shopping" devices. As one example, the portable shopping assistant device may comprise a cell phone-type device that is adapted to providing a product scanner function. As another example, a wireless personal digital assistant ("PDA") scanning function may be used.

Shopping device 195 may also comprise a biometric reader or other means for identifying the shopper who is using the device, enabling the shopper to "log in" to the device. Or, the device may comprise other means of identifying the shopper, such as a keypad on which the shopper can enter a personal identification number ("PIN") that is then compared to a previously-stored value. The shopper may be identified to the device prior to beginning the overall shopping process, thus shortening transaction time when purchasing items. As another approach, the shopper may be identified at each purchase transaction, without deviating from the scope of the present invention. Optionally, the shopper's financial account information may be stored in the portable shopping assistant device. In this case, the stored account information is preferably protected using encryption.

Portable shopping assistant device 195 may optionally include a display area, such as a miniature liquid crystal display ("LCD"), and may include audio functionality using integrated speakers. It may be preferable to use low-cost, low-function digital processing circuits in device 195, rather than traditional high-cost mobile processor and personal computer technology such as chipsets, discrete memory modules, input/output chips, and so forth.

Referring now to a retail environment, by way of example, a shopper may purchase items directly from a retail store shelf (or other protected area) using techniques disclosed herein, as mentioned earlier. When the shopper removes an item from display case 145, for example, a security sensor such as an RFID antenna that protects the display case senses that the item has been removed, and RFID antenna control processor 155 preferably transmits 135 a notification to security system processor 105. In addition, upon detecting the item removal, preferred embodiments provide a message to the shopper to inform the shopper that he or she may purchase the item by scanning it using the portable shopping assistant 195, or that alternatively, the item should be returned to the protected area. This message may be presented visually and/or audibly. FIG. 1 illustrates an integrated shopper information display 170 (which may be a conventional computer monitor-type display) at the protected area 145 and speakers 165 that may be provided for this purpose. Furthermore, in preferred embodiments, a photograph of the shopper is taken using a surveillance camera 140 that is positioned to capture images of shoppers for this protected area. Multiple cameras may be used for a particular protected area, if desired. Furthermore, video cameras may be used instead of, or in addition to, still cameras. Preferably, all items within the protected area are within line-of-sight coverage for the camera or cameras, thus providing complete coverage for the area.

An item-specific time interval is preferably used to determine how long the shopper may keep an item out of the protected area, without purchasing it, before theft of the item is suspected. If this time interval is exceeded, a warning may be provided to remind the shopper that a decision is needed to either purchase the item or return it to the protected area (and the return of the item to the protected area is detected by the RFID antenna or other security sensors which are used to protect that area). Signal lights 150 may be flashed for this warning, for example. In addition or instead, a warning message may be provided audibly using speakers 165 and/or visually using information display 170. Security personnel may be alerted when theft is suspected. Such alerts may be audible and/or visual. It may be desirable to provide such alerts in a manner that prevents the shopper from hearing and/or viewing them, for example by sending a message to a mobile device of the security personnel. Refer also to FIGS. 3-8, where this processing is discussed in more detail.

Inventory management system 100 also preferably includes a security system processor 105, and this security system processor is communicably coupled to the RFID antenna control processor 155 (or other processor or controller) of the protected area or areas such as display case 145. Wireless or wired means may be used for communications therebetween. The security system processor preferably comprises security system control software 115 and is also communicably coupled to a server 175 which hosts personal shopping assistant management software 180 and RFID inventory management software 185. (Alternatively, these software applications may be hosted on the same device as the security system control software 115 without deviating from the scope of the present invention.) Preferably, the security system processor 105 is responsible for generating and distributing the audio speaker output (see 110*a*), video display output (see 110*b*), security personnel alerts (see 110*c*), and signal light output (see 110*d*) discussed above. Security system processor 105 is also preferably responsible for receiving the captured images of shoppers' photographs (see 110*e*), and may also receive input from RFID sensors placed at the store exit (see 110*f*), as will be discussed in more detail below.

The server 175 (or a data repository accessible therefrom) preferably stores information about the store's inventory. RFID inventory management software 185 is preferably adapted for subtracting purchased items from inventory, and may also subtract items from inventory when those items are determined to have been stolen or are otherwise unaccounted for. Server 175 also may store information about shoppers, which may be associated with a shopper's loyalty card account. Optionally, a shopper's account number at one or more financial institutions may be stored at server 175 (or a data repository accessible therefrom). Alternatively, this information may be retrieved from the shopping device 195 (and in this case, encrypted communications are used in preferred embodiments for communications 190 that transfer such information).

A communications mechanism 125, such as a broadband Internet connection, a telephone line connection, or a wireless connection (shown generally at reference number 120) is preferably used at server 175 to transmit and receive financial information regarding a shopper's item purchases. For example, an amount of the shopper's purchase may be transmitted to a financial institution such as a bank or credit card company, and verification of sufficient funds and/or notification of funds transfer to an account of the retailer may be transmitted from the financial institution. It should be noted that financial institutions with which transactions may be processed are not limited to traditional banks and credit card companies. As one alternative, a provider of the wireless service used for transmitting messages to and from the shopper's portable shopping assistant device may process purchase transactions on behalf of the shopper, and such transactions may be charged to the shopper's account with the wireless service provider. As another alternative, the purchase transaction information may be communicated to another entity such as a telephone ordering center within a retail store, and this entity may then communicate externally with the shopper's financial institution.

It may be desirable in some environments to provide shopping carts (not shown in FIG. 1) with lids or other means that prevent casual removal of the paid-for items stored therein (for example, to prevent unscrupulous shoppers from stealing from other shoppers' carts).

Personal shopping assistant management software 180 will now be described in more detail with regard to the flowcharts depicted in FIGS. 3-8.

Figure 3:
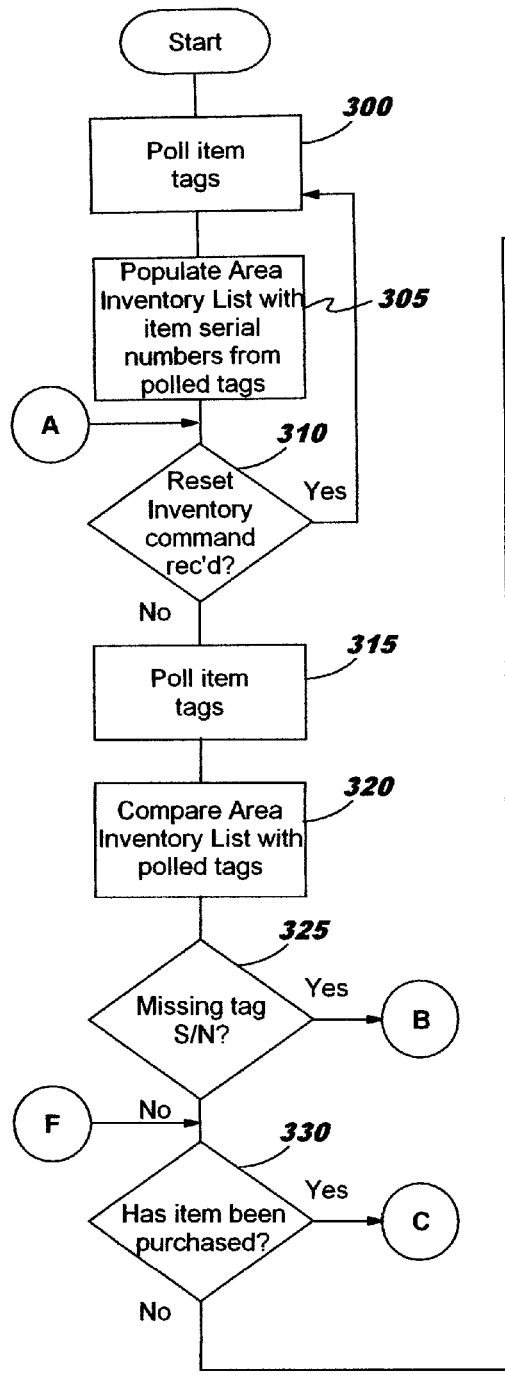
FIGS. 3-8 provide flowcharts depicting logic that may be used when implementing preferred embodiments.
Figure 3:
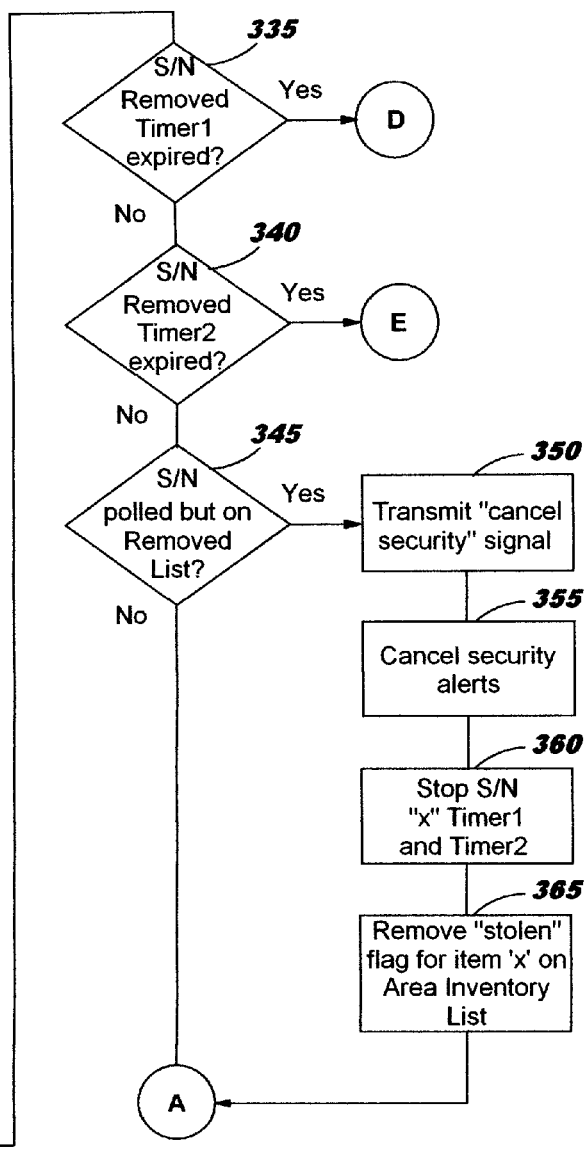

Referring first to FIG. 3, a polling operation is initially performed (Block 300) to gather information from the item-integrated RFID tags of all items in a protected area. Upon receiving the results, an Area Inventory List is populated with the serial number ("S/N") obtained when reading the RFID tag of each detected item (Block 305).

Note that while UPC codes traditionally store only a product category or type, such as a particular brand of facial tissues in a particular sized box and color, RFID tags are generally adapted for storing an "Electronic Product Code" ("EPC"). An EPC identifies a consumer product individually, not just by type. Present versions of the code used for EPCs comprise 96 bits of information, organized as an 8-bit header, two sets of 24 bits that identify the manufacturer and the product type (respectively), and a 40-bit serial number. (Ninety-six bits encode enough information to uniquely identify trillions of objects.) Preferred embodiments preferably use this 40-bit serial number, and may optionally also use the manufacturer and product type information.

After populating the Area Inventory List, an iterative loop for monitoring the items in the protected area then begins at Block 310, which checks to see if a "Reset Inventory" command has been received. It may be desirable to reset the inventory list for an area when shelves are restocked with new merchandise, for example. Accordingly, if a reset command was received, control transfers to Block 300 to re-poll the items in the protected area and update the inventory list. Otherwise, processing continues at Block 315.

At Block 315, a polling operation is performed to determine the items currently within the protected area. Preferably, any items on this list that are flagged as "stolen" (as discussed below with reference to Block 715 of FIG. 7) are not further processed during this polling operation. The Area Inventory List that was established at Block 305 is compared (Block 320) to the results of this polling operation, for those items from the Area Inventory List which have not been flagged as stolen. Block 325 checks (using the item serial numbers) to see if any of the non-flagged items from the Area Inventory List are missing in the newly-polled list. If so, then for each of the missing items, control transfers to the logic depicted in FIG. 4, which in preferred embodiments performs a first of several levels of security processing.

Figure 8:
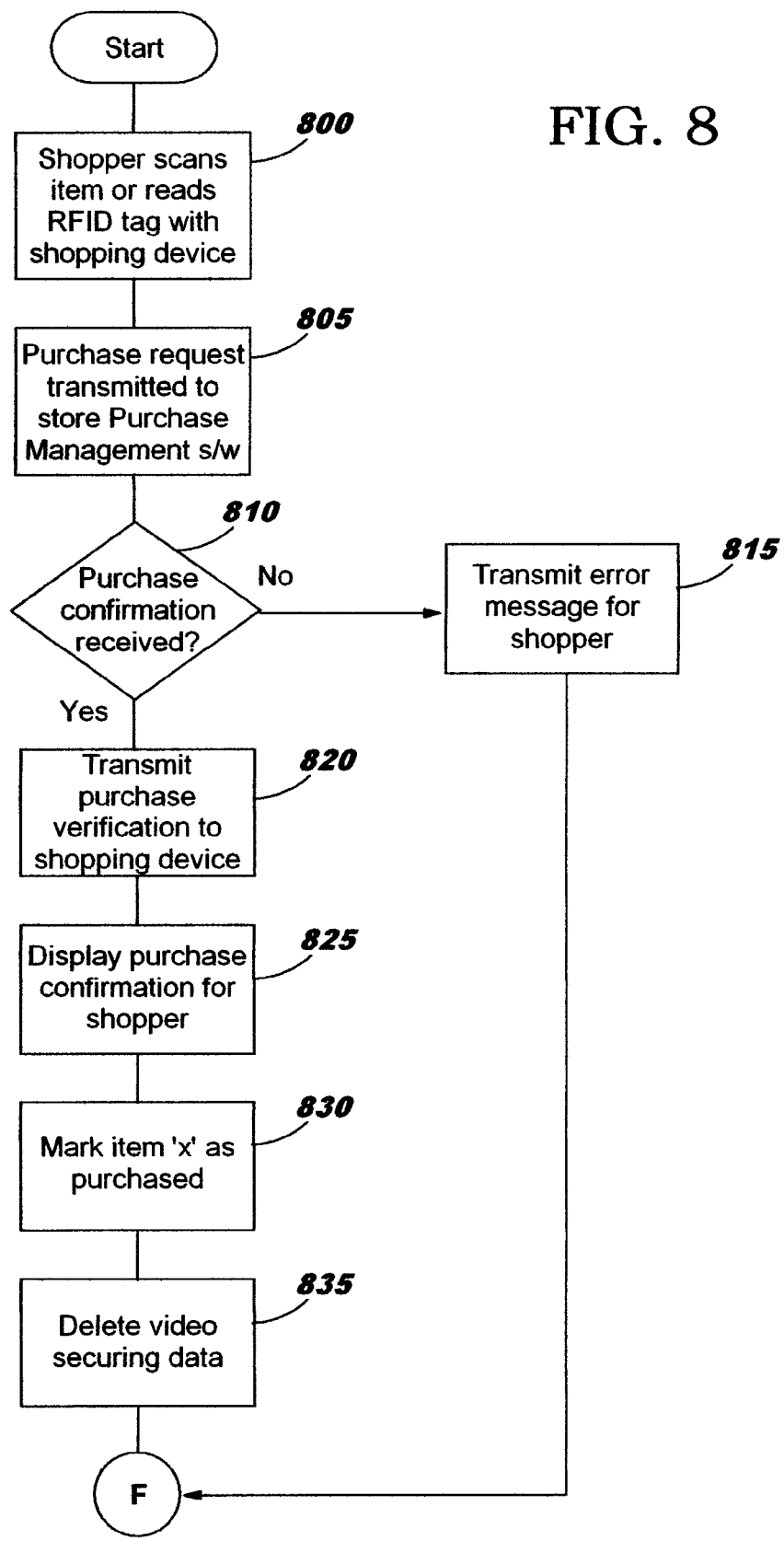

FIG. 3 illustrates, between Blocks 325 and 330, encircled "F", which indicates that the purchase transaction processing shown in FIG. 8 may be carried out at this point (e.g., responsive to detecting that the shopper scans a removed item).

Figure 4:
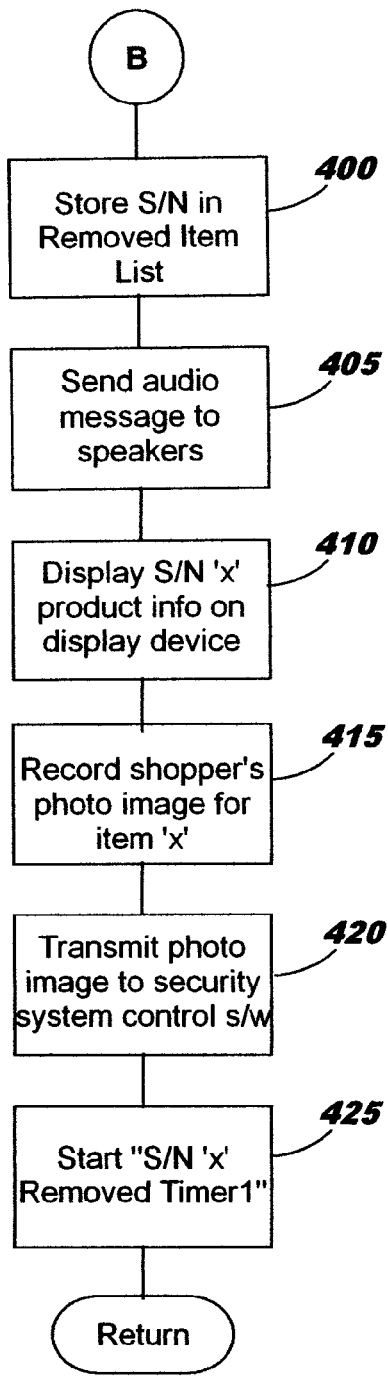

Following a negative result at Block 325 (i.e., when none of the serial numbers are missing) and following completion of the processing in FIG. 4, processing continues at Block 330.

Referring now to FIG. 4, this processing represents a first level of security whereby the item removal is detected, the shopper receives feedback that a system is monitoring their actions, the first level of security system is activated to monitor the environment, and an interval timer is started, as will now be described. In preferred embodiments, the serial number of an item which is missing from the newly-polled list is stored in a Removed Item List (Block 400) for this protected area. For ease of reference, this serial number is referred to in the figures as having some value 'x', where 'x' represents a value that uniquely identifies that product among the products in the protected area. At this point, it may be presumed that the shopper has removed the item for purchase or perhaps for inspection, for example to read information contained on the item's label. Preferred embodiments therefore provide information designed to assist the shopper in making a purchase, as will now be described with reference to Blocks 405-410.

In Block 405, an audible message is preferably sent to the speakers which are found at the protected area (see reference number 165 of FIG. 1). This message may be a pleasant greeting to the shopper as a subtle signal that a security system is monitoring his or her actions, or a direct message that a security system is in progress to prevent theft. The audio message may also (or alternatively) provide information about the item which was removed, such as its price, and/or instructions about how to make a purchase. In addition to or instead of an audible message, such information may be displayed visually (Block 410), and this visual display may use the display device found at the protected area (see reference number 170 of FIG. 1). Or, one portion of the information to be provided may be sent to the speakers, while a different portion is sent to the visual display device. In alternative embodiments, information may be sent to speakers and/or a display of the shopper's personal shopping device 195.

Optionally, the visual display may contain a touch-sensitive overlay or other mechanism which allows interaction by the shopper. The shopper may use this to page through different screens of information about the item, for example. As other examples, the shopper may use the interaction mechanism to access a wide variety of information concerning the items for sale, to obtain remote purchasing instructions, to request assistance from store personnel, or to perform other tasks that may be desired in a retail shopping environment.

As a further theft deterrent, still or real-time motion video of the shopper may be displayed to the shopper on the visual display mounted at the protected area. This visual image may also be used by security personnel to identify and track a potential thief as they move about the store and eventually attempt to leave the premises. Storage of the video images may be subsequently purged, for example at such time that the image is no longer required for security or the storage database becomes filled. Surveillance camera 140 preferably captures a photographic image of the shopper (Block 415). In Block 420, this image and an association of the image with the removed item having serial number 'x' is transmitted to security system control software (see reference number 115 of FIG. 1). Wired or wireless means may be used for this transmission (not shown in FIG. 1). The image (and/or video, as appropriate) is then sent to server 175 for storage and processing, in preferred embodiments.

At Block 425, a timer is started for this particular removed item. The timer is referred to herein as "S/N 'x' Removed Timer1". This timer is used to count down an interval of time during which the item having a particular serial number remains out of the protected area without having been purchased by the shopper. The interval of time to use for each item may be identical; alternatively, item-specific time intervals may be used. In the latter case, the length of the interval is preferably configured such that the shopper is allowed sufficient time to inspect this particular removed item.

Control then returns to FIG. 3, resuming processing at Block 330, which tests to see if the item having serial number 'x' has been purchased by the shopper. If the test in Block 330 has a positive result (i.e., the missing item was purchased), then for each of those items, control transfers to the logic depicted in FIG. 5. Otherwise, processing continues at Block 335 (and control also resumes at Block 335 following completion of the processing in FIG. 5).

Figure 5:
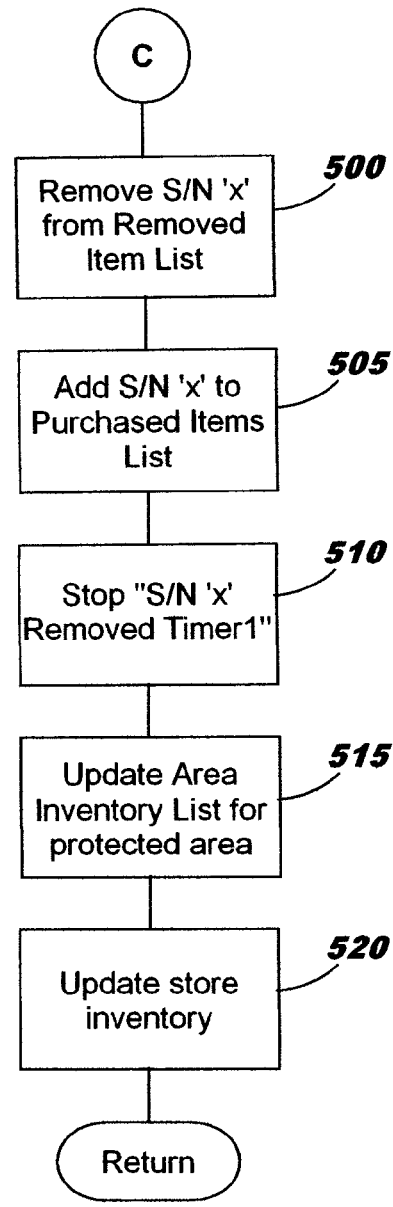

Referring now to FIG. 5, the purchased item with serial number 'x' is preferably removed from the Removed Item List (Block 500) for the protected area, such that the security system no longer monitors the item, and is added to a Purchased Items list (Block 505). Also, the "S/N 'x' Removed Timer1" timer is stopped (Block 510). Block 515 then updates the Area Inventory List for this protected area, such that the item with serial number 'x' is no longer on the list. The general retail store inventory database is preferably also updated to reduce the overall store inventory, reflecting the item purchased (Block 520). The shopper has taken ownership of the item at this point.

Control then returns to FIG. 4, resuming processing at Block 335, which tests to see if a "S/N Removed Timer1" has ended for any items from this protected area. If so, then for each of those items, control transfers to the logic depicted in FIG. 6. Otherwise, processing continues at Block 340 (and control also resumes at Block 340 following completion of the processing in FIG. 6).

Figure 6:
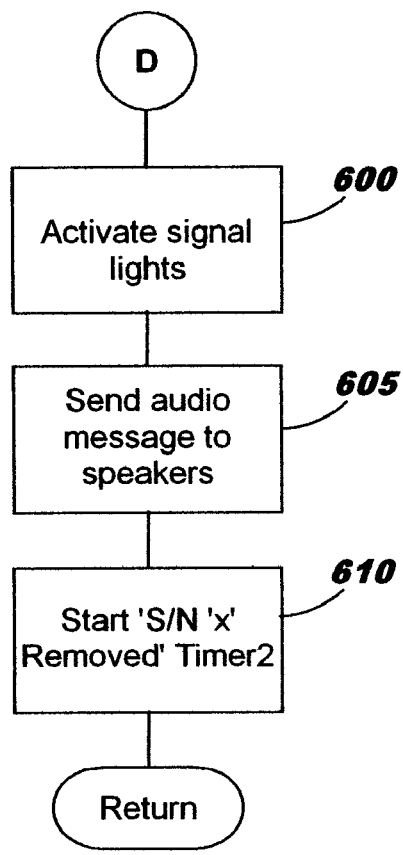

Referring now to FIG. 6, a second level of progressive security measures is reflected therein. According to preferred embodiments, this second level gives a shopper an additional warning that an item which has been removed from the protected area—for a time interval longer than permitted by the item's "Timer1" value—must either be purchased or returned to the protected area. Accordingly, Block 600 preferably activates signal lights at the protected area (see reference number 150 of FIG. 1), and in Block 605, an audio message is preferably sent to the speakers 165. This audio message preferably informs the shopper of his or her options, e.g., to complete the purchase or return the item. The message may also inform the shopper that security personnel will be notified in the event that neither of these actions occurs in a timely manner.

Preferred embodiments then start another timer, referred to herein as "S/N 'x' Removed Timer2" (Block 610). This timer is used to count down an interval of time during which the shopper can complete the purchase of the item having serial number 'x' or return the item to the protected area. The interval of time used for this timer is preferably shorter than the interval used for the "Timer1" timer (as the shopper has already had sufficient time to inspect the removed item). Optionally, an embodiment of the present invention may notify the shopper of the time interval in the warning message given at Block 605.

Following completion of the processing in FIG. 6, and also following a negative result for the test at Block 335, control reaches Block 340. Block 340 tests to see if a "S/N Removed Timer2" has ended for any items from this protected area. If so, then for each of those items, control transfers to the logic depicted in FIG. 7. Otherwise, processing continues at Block 345 (and control also resumes at Block 345 following completion of the processing in FIG. 7).

Figure 7:
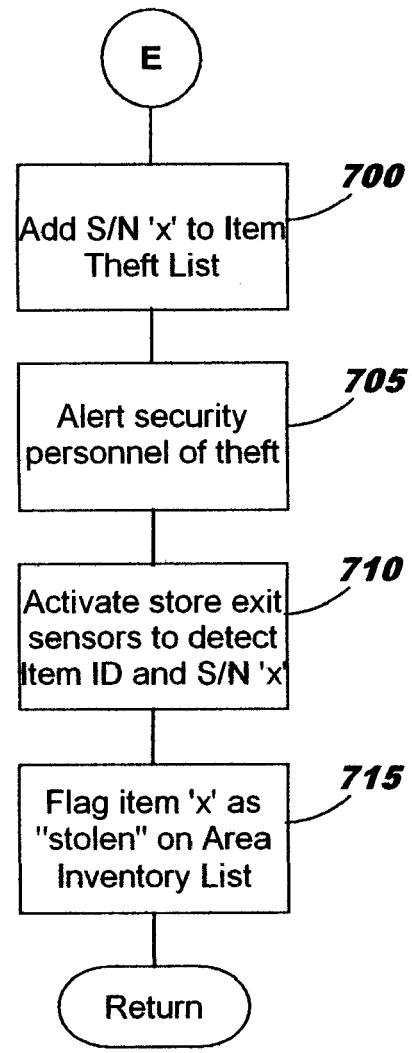

Referring now to FIG. 7, a third progressive level of security is provided by preferred embodiments that notifies security personnel when theft of an item from a protected area is suspected. This processing is invoked when both the "Timer1" and "Timer2" values for the item having serial number 'x' have elapsed without the item either being purchased or returned to the protected area. Accordingly, it may be presumed that the item having serial number 'x' has been stolen. Block 700 preferably adds the item's serial number to an Item Theft List. In Block 705, security personnel are notified. As mentioned earlier, this notification may be sent in a way that prevents the suspected thief from being warned, for example by sending a message to a mobile device of the security personnel. The captured image of the shopper may be included with this notification. Item sensors located at the store exit (which may be of a conventional type) are preferably activated at Block 710, and may be adapted to receive a notification of the item serial number and/or other item-identifying information of the particular item, such that the sensor can monitor and thus detect when the shopper attempts to pass through the exit with this particular item.

In Block 715, the item is preferably flagged as "stolen" on the Area Inventory List. Rather than remove the item from the list entirely, this flagging approach facilitates getting the item back onto the correct shelf if the theft is prevented. Security system control software 115 preferably runs an audit process to delete a flagged item from the Area Inventory List when a theft of the item is confirmed. This confirmation is preferably provided by security personnel.

Following completion of the processing in FIG. 7, and also following a negative result for the test at Block 340, control reaches Block 345. Block 345 tests to see any of the items previously removed from a protected area have been found by the polling operation (e.g, the polling operation has detected the serial number of an item on this protected area's Removed Item List). This typically indicates that the shopper has returned a previously-removed item to the protected area rather than purchasing it. If various levels of security have been activated, then those levels are deactivated, as will now be described.

In Block 350, a "cancel security" signal is sent to the security system control software 115. Any security alerts that have been issued are cancelled (Block 355). Any timers that are running for this item are stopped (Block 360), including the "S/N Removed Timer1" and "S/N Removed Timer2". In Block 365, the "stolen" flag for the item is removed from the Area Inventory List.

When the test in Block 345 has a negative result and also following completion of Block 365, control transfers to Block 310 to begin another iteration of the logic for monitoring the items in the protected area.

Referring now to FIG. 8, logic is depicted to illustrate how a purchase transaction may be carried out. After deciding to purchase a removed item, the shopper uses a personal shopping device to scan the item (Block 800) to obtain an item identification. This scanning may comprise scanning a bar code (such as a UPC code); in addition or instead, the item's integrated RFID tag may be scanned. Scanning the RFID tag is preferable, as it enables uniquely identifying this particular item (as has been discussed above). In alternative embodiments, if a unique identifier is not available in this scanning phase (for example, if the portable shopping assistant device does not have an RFID reader), then the UPC or other scanned identifier may be used to obtain a unique identifier from the item from the RFID polling logic.

When an RFID reader is used to scan a product for the purpose of purchasing that item, the RFID reader will preferably be configured have a relatively limited-range antenna. This enables the RFID reader to discriminate between the item to be purchased and all the other like item that remain in the protected area (e.g., on the shelf). This limited range may be (for example) less than one inch, and an appropriate range may be established (for example) by changing the size of the RFID reader's antenna. Using a limited-range antenna facilitates scanning of only an item actually being purchased.

In Block 805, a purchase request, including an identification of the item being purchased and information identifying the shopper, is transmitted from the shopper's personal shopping assistant device to Purchase Management software at the store, which is preferably hosted on server 175. The transmission from the personal shopping assistant device to server 175 preferably uses wireless communications (see reference number 190 in FIG. 1).

The Purchase Management software is preferably adapted for receiving the transmitted information from the personal shopping assistant device, obtaining pricing information for the item identified therein, and requesting payment from a financial institution associated with this shopper. As noted earlier, encrypted communications are preferably used if information pertaining to the shopper's financial institution (such as an account number) is transmitted with the purchase request. As one alternative, the store may determine the information pertaining to the shopper's financial institution using previously-stored or previously-obtained information (which may be associated with a shopper loyalty card of this shopper, for example).

Prior art techniques may be used for the Purchase Management software that completes the purchase request received at server 175. For example, the retail store may have stored credit card numbers of its frequent shoppers maintained by a database on server 175. In this case, at the time of purchase, the shopper may be prompted for a personal security verification (e.g., a PIN number or password prompt, biometric information verification, or encrypted private security software key). After the shopper's identity has been verified by the Purchase Management software on server 175, the shopper preferably signals his or her permission to complete the purchase transaction with the credit card company, as a normal credit card transaction would take place. Other known means of electronic purchase may be used by embodiments of the present invention, such as Electronic Funds Transfer with a financial institution or via a debit card transaction directly with the shopper's bank account.

As an alternative to encrypting only those transmissions which transmit the shopper's financial or account information, it may be preferable to encrypt all transmissions to and from the portable shopping assistant device. Optionally, embodiments of the present invention may provide a configuration interface whereby an administrator can specify which communication flows should be encrypted.

Block 810 tests to see if a purchase confirmation has been received from the shopper's financial institution. If not, then an error message may be transmitted to the shopper (Block 815). This error message may be presented by audible and/or visual means, and may be presented using the speakers and/or display device of the protected area and/or of the shopper's portable shopping assistant device. Upon completion of the error message processing, control preferably exits from FIG. 8.

When the test in Block 810 has a positive result (i.e., the purchase confirmation has been received), control reaches Block 820, where a purchase verification message is preferably transmitted to the shopper's portable shopping assistant device. A purchase confirmation message is then presented to the shopper (Block 825), giving the shopper immediate feedback that the purchase transaction has been completed (and that the shopper's account has been charged). As with the error message discussed above, this confirmation message may be audible and/or visual, and is preferably presented using speakers and/or a display area of the portable shopping assistant device. Optionally, a purchase confirmation may be also be presented using the speakers and/or display device of the protected area.

Block 830 then marks the item 'x' as being purchased on a shopping list that is maintained, in preferred embodiments, by the personal shopping assistant device. At Block 835, the previously-captured photo and/or video images of the shopper (discussed above with reference to Block 415 of FIG. 4) is/are preferably deleted, now that the item has been purchased. Control then exits from FIG. 8.

When an embodiment of the present invention is used in an environment where the items of the protected area are not for purchase, such as the employee item checkout and library patron checkout environments discussed earlier, the processing in FIG. 8 may be adapted accordingly. For example, rather than completing a purchase transaction by a shopper, the transaction of interest may be completing a library item checkout by a library patron. In this case, rather than communicating with a financial institution to process a purchase, the transaction may comprise communicating with a library patron system to assign the scanned library items to an account represented by this person's library card. Accordingly, the term "removal transaction" may be used in a generic sense to include purchase transactions and other transactions that follow from an item being removed from a protected area.

Figure 9:
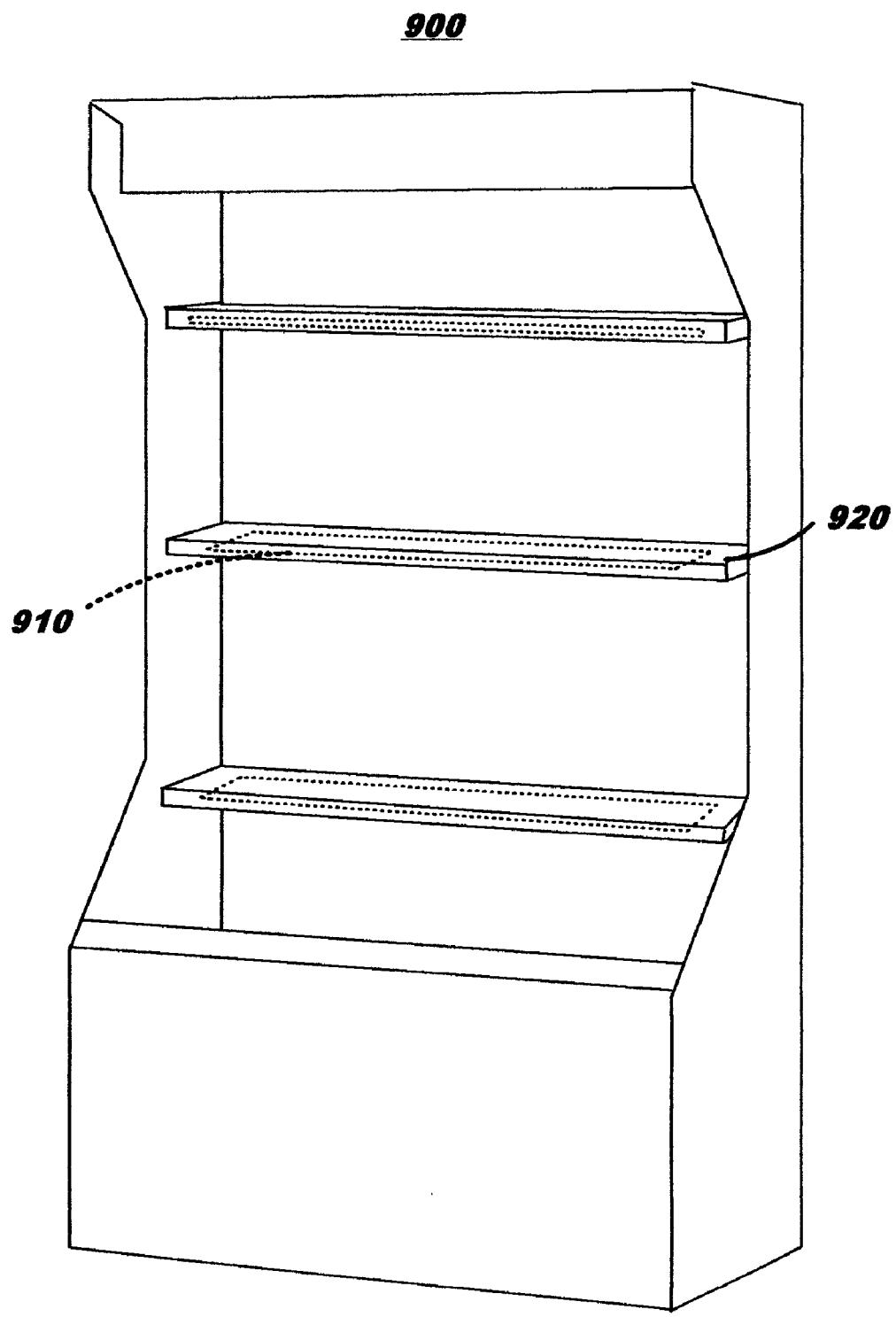
FIG. 9 depicts a sample shelf system showing a plurality of shelves with RFID antennas configured.

Referring now to FIG. 9, a sample shelf system 900 is depicted showing a plurality of shelves with RFID antennas configured. For ease of illustration, the antennas are shown using a dashed outline. See, for example, shelf 920 and its corresponding antenna 910. The antennas may be embedded within the shelves, mounted under the shelves, mounted on top of the shelves, or otherwise coupled thereto. Location of antennas may be configured for optimum readability of RFID tags and may depend on factors such as whether shelf units are metallic or non-metallic; whether product RFID tags are located on the top or bottom of the items to be contained within the protected area; or other physical relationships between the RFID tags, topology of shelf units, and proximity of RF-inhibiting materials such as metal shelves and metal products containing RFID tags. In this sample system 900, the configuration of the antennas facilitates reading RFID tags coupled to the tops of metal cans placed on the shelves (by way of example).

As has been described, using techniques disclosed herein, shoppers may purchase items directly from the shelves or other protected areas, where the purchase transaction is facilitated by the portable shopping assistant device. The protected areas thus function as virtual vending machines, whereby ownership of an item can begin immediately after removing the item from the protected area. The shopper then does not need to go through a checkout line at the front of the store, which may result in considerable time savings for the shopper and reduced labor costs for the retailer. The retailer may also eliminate or reduce store-front point-of-sale stations, leading to reduced equipment costs. As an alternative, traditional store-front theft detection mechanisms may continue to be used, thus providing another opportunity to prevent theft. For example, a store-front POS station may scan the RFID tags in the shopper's cart to ensure the items have been marked as being paid for (e.g., by comparing the item identifiers from the scanned RFID tags to Purchased Items lists that have been created as discussed above with reference to Block 505 of FIG. 5). In contrast to current self-checkout POS stations, techniques of the present invention alleviate the need to individually weigh each purchased item for security purposes.

Analogous types of transactions may be carried out in other environments in a similar manner, and similar savings may be realized. For example, a library patron may scan books or other items at the shelf, thus causing an immediate checkout of those items, and can then exit the library without having to go through a checkout process at the library checkout desk.

As will be appreciated by one of skill in the art, embodiments of the present invention may be provided as (for example) methods, systems, and/or computer program products. The invention preferably takes the form of an embodiment containing both hardware and software elements (although an embodiment comprising only hardware elements, in which the above-described processing logic may be encoded, for example, on chips, is also within the scope of the present invention). The software may include (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 10:
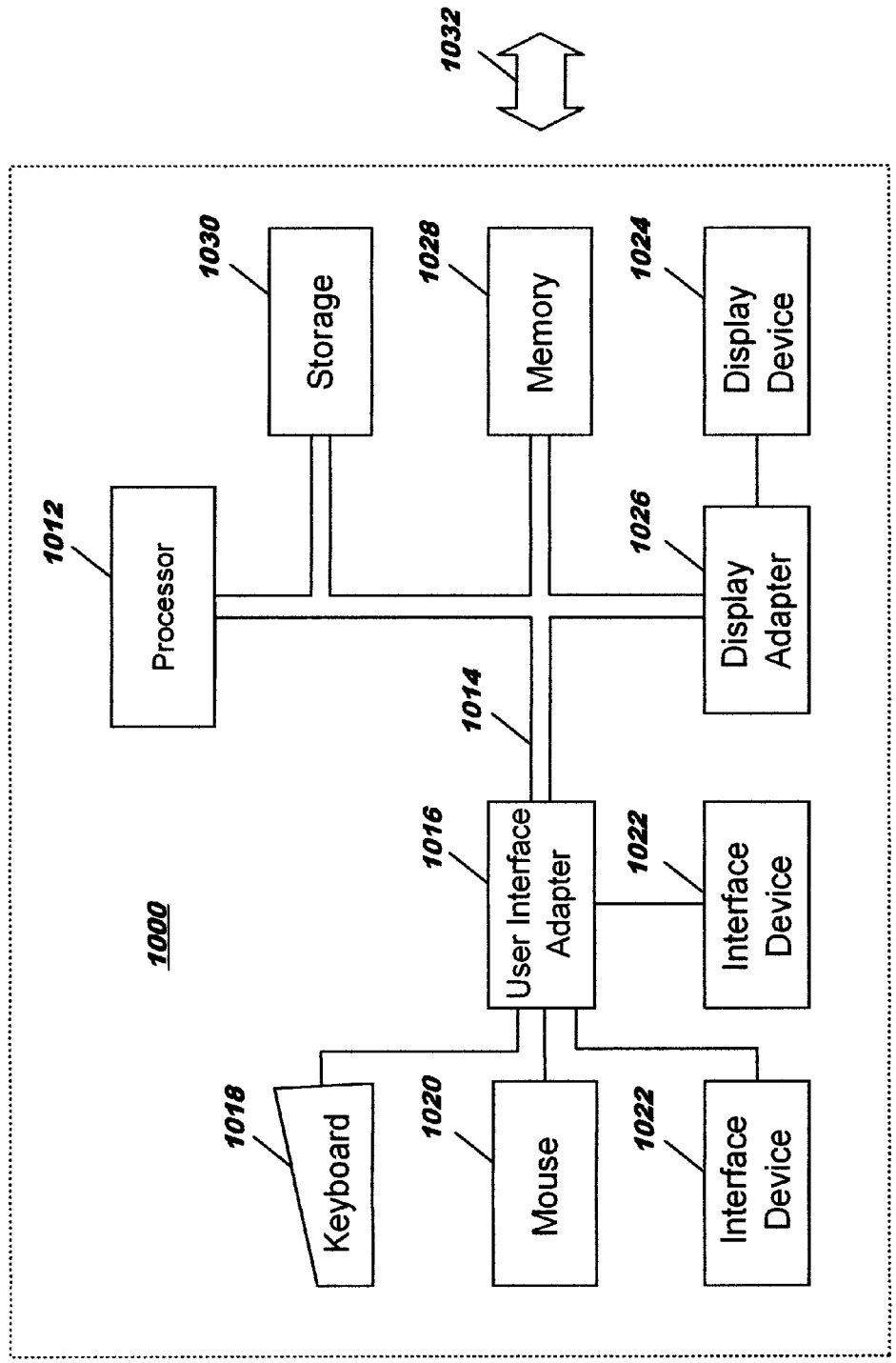
FIG. 10 depicts a data processing system suitable for storing and/or executing program code.

Referring now to FIG. 10, a data processing system 1000 suitable for storing and/or executing program code includes at least one processor 1012 coupled directly or indirectly to memory elements through a system bus 1014. The memory elements can include local memory 1028 employed during actual execution of the program code, bulk storage 1030, and cache memories (not shown) which provide temporary storage of at least some program code in order to reduce the number of times code must be retrieved from bulk storage during execution.

Input/output (I/O") devices (including but not limited to keyboards 1018, displays 1024, pointing devices 1020, other interface devices 1022, etc.) can be coupled to the system either directly or through intervening I/O controllers or adapters (1016, 1026).

Network adapters may also be coupled to the system to enable the data processing system to become coupled to other data processing systems or remote printers or storage devices through intervening private or public networks (as shown generally at 1032). Modems, cable modem attachments, wireless adapters, and Ethernet cards are just a few of the currently-available types of network adapters.

Figure 11:
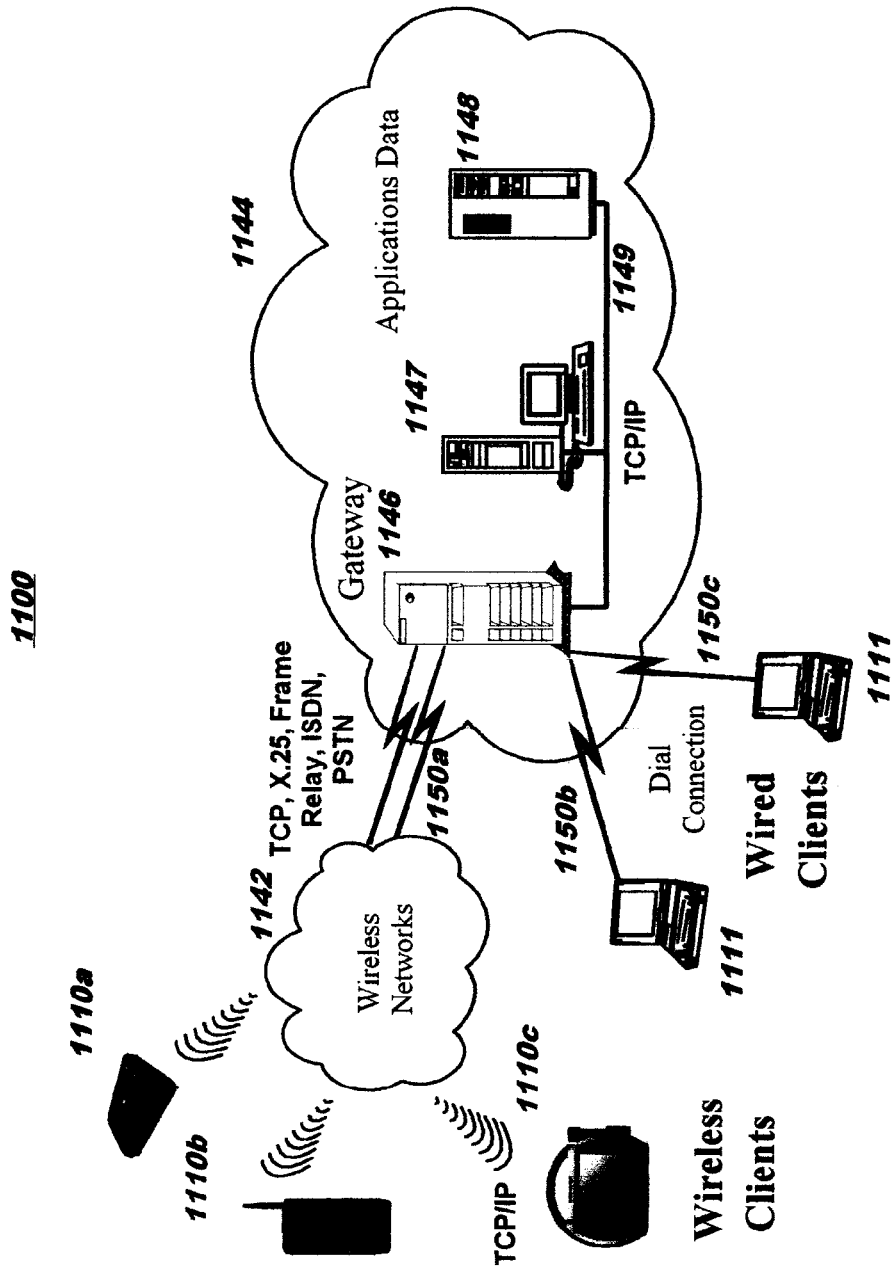
FIG. 11 depicts a representative networking environment in which one or more embodiments of the present invention may be used.

FIG. 11 illustrates a data processing network environment 1100 in which the present invention may be practiced. The data processing network 1100 may include a plurality of individual networks, such as wireless network 1142 and network 1144. A plurality of wireless devices 1110*a*-1110*c* (which, by way of illustration only, represent a wireless pager 1110*a*, a wireless cellular phone 1110*b*, and the IBM Mobile Tablet for Retail 1110*c*) may communicate over wireless network 1142, and a plurality of wired devices, shown in the figure (by way of illustration) as workstations 1111, may communicate over network 1144. Additionally, as those skilled in the art will appreciate, one or more local area networks ("LANs") may be included (not shown), where a LAN may comprise a plurality of devices coupled to a host processor.

Still referring to FIG. 11, the networks 1142 and 1144 may also include mainframe computers or servers, such as a gateway computer 1146 or application server 1147 (which may access a data repository 1148). A gateway computer 1146 serves as a point of entry into each network, such as network 1144. The gateway 1146 may be preferably coupled to another network 1142 by means of a communications link 1150*a*. The gateway 1146 may also be directly coupled to one or more workstations 1111 using a communications link 1150*b*, 1150*c*, and/or may be indirectly coupled to such devices. The gateway computer 1146 may be implemented utilizing an Enterprise Systems Architecture/370™ available from IBM, an Enterprise Systems Architecture/390® computer, etc. Depending on the application, a midrange computer, such as an Application System/400® (also known as an AS/400®) may be employed. ("Enterprise Systems Architecture/370" is a trademark of IBM; "Enterprise Systems Architecture/390", "Application System/400", and "AS/400" are registered trademarks of IBM in the United States, other countries, or both.)

The gateway computer 1146 may also be coupled 1149 to a storage device (such as data repository 1148).

Those skilled in the art will appreciate that the gateway computer 1146 may be located a great geographic distance from the network 1142, and similarly, the wireless devices 1110*a*-1110*c* and/or workstations 1111 may be located some distance from the networks 1142 and 1144, respectively. For example, the network 1142 may be located in California, while the gateway 1146 may be located in Texas, and one or more of the workstations 1111 may be located in Florida. The wireless devices 1110*a*-1110*c* may connect to the wireless network 1142 using a networking protocol such as the Transmission Control Protocol/Internet Protocol ("TCP/IP") over a number of alternative connection media, such as cellular phone, radio frequency networks, satellite networks, etc. The wireless network 1142 preferably connects to the gateway 1146 using a network connection 1150*a* such as TCP or User Datagram Protocol ("UDP") over IP, X.25, Frame Relay, Integrated Services Digital Network ("ISDN"), Public Switched Telephone Network ("PSTN"), etc. The workstations 1111 may connect directly to the gateway 1146 using dial connections 1150*b* or 1150*c*. Further, the wireless network 1142 and network 1144 may connect to one or more other networks (not shown), in an analogous manner to that depicted in FIG. 11.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A computer-implemented method of enabling item purchase directly from an item display area, the method comprising:
    monitoring, by at least one security sensor positioned to protect an item display area, presence of each of at least one item contained within the item display area, wherein each of the at least one item has a transmission mechanism coupled thereto or integrated therewithin, the transmission mechanism sending signals that are detectable by at least one of the at least one security sensor while the at least one item remains within proximity thereof; and
    responsive to detecting, by at least one of the at least one security sensor, a removal of any one of the at least one item from the item display area, performing a purchase verification process for the removed item, the purchase verification process comprising:
    starting a timer responsive to the detecting of the removal;
    obtaining a unique identifier of the removed item by interrogating information from the transmission mechanism coupled to or integrated within the removed item; and
    responsive to receiving a signal, at the item display area, that a purchase of the removed item is initiated at the item display area before expiration of the timer, invoking a purchase transaction for the removed item, and otherwise generating a security alert for the removed item.

2. The method according to claim 1, wherein each of the at least one security sensor comprises at least one radio-frequency identification ("RFID") antenna.

3. The method according to claim 1, wherein each of the at least one security sensor is a radio-frequency identification ("RFID") sensor and wherein the transmission mechanism for each of the at least one item is an RFID security tag.

4. The method according to claim 3, wherein the unique identifier of the removed item comprises an item identifier obtained from the RFID security tag.

5. The method according to claim 1, wherein the signal comprises a scan of the unique identifier of the removed item and an indication that a person removing the removed item is paying for the removed item.

6. The method according to claim 5, wherein the scan of the unique identifier comprises a bar code scan of the removed item, the bar code scan obtained by the person using a portable shopping device.

7. The method according to claim 1, wherein the item display area comprises a display case.

8. The method according to claim 1, wherein the item display area comprises at least a portion of a shelf.

9. The method according to claim 1, wherein the timer expires at an interval that is configurable for each of the at least one item in the item display area.

10. The method according to claim 1, wherein the purchase verification process further comprises identifying a person removing the removed item.

11. The method according to claim 10, wherein identifying the person comprises capturing a photo image of the person.

12. The method according to claim 10, wherein identifying the person comprises capturing a video image of the person.

13. The method according to claim 11, further comprising deleting the captured photo image of the person, responsive to a notification that the purchase transaction is completed before the expiration of the timer.

14. A system for enabling item purchase directly from an item display area, comprising:
    at least one security sensor positioned to protect an item display area, for monitoring presence of each of at least one item contained within the item display area, wherein each of the at least one item has a transmission mechanism coupled thereto or integrated therewithin, the transmission mechanism comprising a security tag sending signals that are detectable by at least one of the at least one security sensor while the at least one item remains within proximity thereof;
    a computer comprising a processor; and
    instructions configured to execute, using the processor, to implement functions comprising:
    responsive to detecting, by at least one of the at least one security sensor, a removal of any one of the at least one item from the item display area, performing a purchase verification process for the removed item, the purchase verification process comprising:
    starting a timer responsive to the detecting of the removal;
    obtaining a unique identifier of the removed item by interrogating the security tag coupled to or integrated within the removed item; and
    responsive to receiving a signal, at the item display area, that a purchase of the removed item is initiated at the item display area before expiration of the timer, invoking a purchase transaction for the removed item, and otherwise generating a security alert for the removed item.

15. The system according to claim 14, wherein each of the at least one the security sensor comprises a radio-frequency identification ("RFID") sensor and wherein the security tag for each of the at least one item is an RFID security tag.

16. The system according to claim 15, wherein obtaining the unique identifier of the removed item further comprises obtaining an item identifier from the RFID security tag.

17. A computer program product for enabling item purchase directly from an item display area, the computer program product comprising at least one non-transitory computer-usable storage medium having computer-usable program code embodied therein, the computer-usable program code configured for:
monitoring, by at least one security sensor positioned to protect an item display area, presence of each of at least one item contained within the item display area, wherein each of the at least one item has a transmission mechanism coupled thereto or integrated therewithin, the transmission mechanism comprising a security tag sending signals that are detectable by at least one of the at least one security sensor while the at least one item remains within proximity thereof; and
responsive to detecting, by at least one of the at least one security sensor, a removal of any one of the at least one item from the item display area, performing a purchase verification process for the removed item, the purchase verification process comprising:
starting a timer responsive to the detecting of the removal;
obtaining a unique identifier of the removed item by interrogating the security tag coupled to or integrated within the removed item; and
responsive to receiving a signal, at the item display area, that a purchase of the removed item is initiated at the item display area before expiration of the timer, invoking a purchase transaction for the removed item, and otherwise generating a security alert for the removed item.

18. The computer program product according to claim 17, wherein each of the at least one the security sensor comprises a radio-frequency identification ("RFID") sensor and wherein the transmission mechanism for each of the at least one item is an RFID security tag.

19. The computer program product according to claim 17, wherein the signal comprises a scan of the unique identifier of the removed item and an indication that a person removing the removed item is paying for the removed item, the scan of the unique identifier comprising using a portable shopping device, by the person, to scan a bar code of the removed item.

20. The computer program product according to claim 17, wherein the security alert indicates that the removed item was stolen.

* * * * *